(12) United States Patent
Otsuki

(10) Patent No.: US 7,893,147 B2
(45) Date of Patent: Feb. 22, 2011

(54) RADIAL TIRE

(75) Inventor: Hirotoshi Otsuki, Kobe (JP)

(73) Assignee: Sumitomo Rubber Industries, Ltd., Kobe-Shi Hyogo-ken (JP)

( * ) Notice: Subject to any disclaimer, the term of this patent is extended or adjusted under 35 U.S.C. 154(b) by 856 days.

(21) Appl. No.: 11/377,205

(22) Filed: Mar. 17, 2006

(65) Prior Publication Data

US 2006/0217481 A1    Sep. 28, 2006

(30) Foreign Application Priority Data

Mar. 28, 2005   (JP) ............................. 2005-092096

(51) Int. Cl.
  *B60C 1/00* (2006.01)
  *C08K 3/04* (2006.01)
  *C08K 3/36* (2006.01)

(52) U.S. Cl. .................. 524/493; 524/495; 524/496; 524/575.5; 152/151

(58) Field of Classification Search ................. 524/492, 524/493, 495, 496; 428/492; 152/151
See application file for complete search history.

(56) References Cited

U.S. PATENT DOCUMENTS

| | | | |
|---|---|---|---|
| 5,503,940 A * | 4/1996 | Majumdar et al. ......... | 428/492 |
| 5,696,197 A * | 12/1997 | Smith et al. ................ | 524/495 |
| 6,230,773 B1 * | 5/2001 | Sandstrom et al. .......... | 152/517 |
| 6,455,624 B1 | 9/2002 | Serre | |
| 6,554,041 B1 * | 4/2003 | Ohki et al. .................. | 156/397 |
| 6,602,942 B1 * | 8/2003 | Karato ....................... | 524/474 |
| 2005/0049351 A1 | 3/2005 | D'Sidocky et al. | |

FOREIGN PATENT DOCUMENTS

| | | |
|---|---|---|
| EP | 1 580 037 A1 | 9/2005 |
| JP | 4-274901 A | 9/1992 |
| JP | 7-144516 A | 6/1995 |
| JP | 10-67885 A | 3/1998 |
| JP | 2003-321579 A | 11/2003 |
| JP | 2004-99804 A | 4/2004 |
| JP | 2004-161862 A | 6/2004 |
| JP | 2005-280534 A | 10/2005 |

* cited by examiner

*Primary Examiner*—Vickey Nerangis
(74) *Attorney, Agent, or Firm*—Birch, Stewart, Kolasch & Birch, LLP

(57) ABSTRACT

There is provided a radial tire reducing rolling resistance by having a breaker cushion or a side wall packing comprising a rubber composition in which the loss tangent tan δ is reduced and the complex elastic modulus E* and the fracture feature are improved in good balance. A radial tire having a breaker cushion or a side wall packing comprising a rubber composition containing 20 to 55 parts by weight of carbon black having an iodine adsorption amount of 25 to 75 mg/g and a DBP oil absorption amount of 110 to 150 ml/100 g and 5 to 30 parts by weight of silica having a BET specific surface area of 115 to 200 $m^2/g$ based on 100 parts by weight of a rubber component.

4 Claims, 1 Drawing Sheet

RADIAL TIRE

BACKGROUND OF THE INVENTION

The present invention relates to a radial tire.

The global warming caused by discharge of carbon dioxide has recently proceeded, and the regulation of waste gas of an automobile and the regulation of the discharge of carbon dioxide has been rigidified. Further, in future, the depletion of diesel oil for an automobile obtained from petroleum resources such as gasoline and diesel is forecasted.

Accordingly, requests for fuel-economization for automobiles such as a truck and a bus has been strengthened more and more and development of a tire with little rolling resistance (a tire with little fuel consumption) has been emphasized.

As a method of reducing the rolling resistance of a tire, it is effective to improve tread occupying the maximum weight among tire members and the rolling resistance of a tire has been conventionally reduced by the improvement of the tread. However, since the tread is a tire member affecting abrasion resistance of the tire and grip performance most strongly, it approaches to technical limit to reduce the rolling resistance while keeping abrasion resistance and grip performance.

Consequently, it becomes important to reduce the rolling resistance of the tire by improving a tire member other than the tread from now on.

A breaker cushion or a side wall packing is mentioned as the tire member enabling the reduction of the rolling resistance by improving it without affecting the abrasion resistance of a tire and grip performance. Herein, the breaker cushion means the tire member 1 shown in FIG. 1 and is an important tire member greatly affecting the durability of the tire, ride quality and the like. Further, the side wall packing means the tire member 4 shown in FIG. 2, enhances the rigidity of a tire, as well as relaxes shear stress to enhance the durability of a bead portion.

As an improvement process of the breaker cushion or the side wall packing, for example, the proportion of a filler for reinforcement such as carbon black is reduced by increasing the proportion of a rubber component in a rubber composition for the breaker cushion or a rubber composition for the side wall packing, and the loss tangent tan δ of the rubber composition has been reduced. However, since reinforcement effect to the rubber composition is not adequately obtained and the complex elastic modulus E* of the rubber composition is lowered, the breaker cushion or the side wall packing is easily deformed and energy loss becomes large; therefore the reduction of the rolling resistance of the tire could not be attained.

Further, a large amount of a curing agent is added to the rubber composition for the breaker cushion or the rubber composition of the side wall packing, and the loss tangent tan δ of the rubber composition has been reduced. The rolling resistance can be reduced by adopting this procedure without reducing the proportion of a filler for reinforcement in the rubber composition, but the physical property change of the rubber composition by thermal degradation caused by tire running is enlarged and when the rubber composition is used as the breaker cushion, feature (fracture feature) which can endure impact to the side wall of a tire which is bestowed when a tire runs on a curbstone or when the tire runs on uneven road is not adequate. Further, when the rubber composition is used as the side wall packing, the tire is deformed by load applied to the tire; therefore shear strain generated between body plies is relaxed by deforming the tire by load applied to the tire and the fracture feature enough to endure the load applied to the tire is not adequately obtained.

The request level of the fracture feature differs depending on the kind of a tire, and a radial tire which is used for a vehicle such as a truck and a bus in which load is heavier than a light truck requires the superior fracture feature.

In order to improve the fracture feature of the rubber composition for the breaker cushion or the side wall packing which is used for a vehicle such as a truck and a bus, it has been known that the loss tangent tan δ is reduced and the complex elastic modulus E* and the fracture feature are improved in good balance by reducing the proportion of a filler for reinforcement in the rubber composition, using carbon black (N134 and the like in ASTM code of USA Material Test Association Planning (ASTM 1765)) having high reinforcing property and a large dibutyl phthalate oil absorption amount (DBP oil absorption amount). However, there is a problem that difference between a portion reinforced with carbon black and a portion not reinforced with it in the rubber composition becomes enlarged by developing an aggregate which is formed by linking the particles of carbon black, fracture from the portion not reinforced is easily generated; therefore the fracture feature is lowered. Further, it is difficult to adequately disperse carbon black in the rubber composition and there occurs a problem that kneading time and the kneading number of times is increased.

Further, it is known that the loss tangent tan δ is reduced by enhancing the DBP oil absorption amount and enlarging the particles of carbon black (decreasing iodine adsorption amount). However, there is also a problem that the fracture feature becomes lowered as a result.

Thus, it is difficult that the loss tangent tan δ of the rubber composition for the breaker cushion or the side wall packing is reduced and the complex elastic modulus E* and the fracture feature are improved in good balance, by only using carbon black as a filler for reinforcement.

As the filler for reinforcement, there is additionally silica and there can be obtained the effect that a rubber composition can be drastically reinforced by compounding silica and the loss tangent tan δ of the rubber composition is also reduced. However, it is difficult that the loss elastic modulus * necessary as the rubber composition for the breaker cushion or the side wall packing is not obtained unless a considerable amount of single silica is compounded and tan δ is adjusted to an objective value.

Consequently, not only silica but also carbon black are used in a combination as the filler for reinforcement.

For example, a rubber composition for the breaker cushion using carbon black with silica is disclosed in Japanese Unexamined Patent Publication No. 2004-161862, but carbon black which is the same as N330 class in ASTM code or a small code number. Even if silica is used in a combination, adequate effect was not obtained.

Thus, there is not obtained yet a rubber composition in which the loss tangent tan δ is reduced, and the complex elastic modulus E* and the fracture feature are improved in good balance by only taking the superior reinforcement effect of carbon black and silica.

SUMMARY OF THE INVENTION

It is the purpose of the present invention to provide a radial tire reducing rolling resistance by having a breaker cushion or a side wall packing comprising a rubber composition in which the loss tangent tan δ is reduced and the complex elastic modulus E* and the fracture feature are improved in good balance.

The present invention relates to a radial tire having a breaker cushion or a side wall packing comprising a rubber composition containing 20 to 55 parts by weight of carbon black having an iodine adsorption amount of 25 to 75 mg/g and a dibutyl phthalate oil absorption amount of 110 to 150 ml/100 g and 5 to 30 parts by weight of silica having a BET specific surface area of 115 to 200 m$^2$/g based on 100 parts by weight of a rubber component.

The fore-mentioned radial tire has preferably a breaker cushion comprising a rubber composition in which the amount of carbon black is 20 to 40 parts by weight and a complex elastic modulus E* is 3 to 5.5 MPa and a loss tangent tan δ is less than 0.05 which is measured at a measurement temperature of 70° C., an initial strain of 10%, a dynamic strain of ±2% and a frequency of 10 Hz.

The fore-mentioned radial tire has preferably a side wall packing comprising a rubber composition in which the iodine adsorption amount of carbon black is 40 to 74 mg/g and its amount is 30 to 40 parts by weight and the amount of silica is 10 to 30 parts by weight, and a complex elastic modulus E* is 4 MPa or more and a loss tangent tan δ is less than 0.06, which are measured at a measurement temperature of 70° C., an initial strain of 10%, a dynamic strain of ±2% and a frequency of 10 Hz in the fore-mentioned rubber composition.

The fore-mentioned radial tire is preferably loaded on a heavy load vehicle (bus or truck).

DETAILED DESCRIPTION

The radial tire of the present invention has a breaker cushion and a side wall packing comprising a rubber composition.

Figure 1:
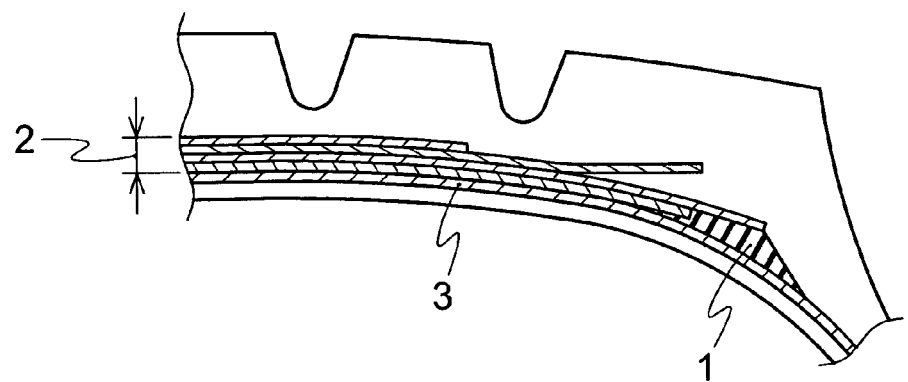
FIG. 1 is a partial sectional view of the tread portion of a radial tire having a breaker cushion. Numeral 1, 2, and 3 respectively denote a breaker cushion, a breaker, and a case.

Herein, the breaker cushion 1 means a layer provided between the edge portion of a breaker 2 and a case 3 as shown FIG. 1.

Figure 2:
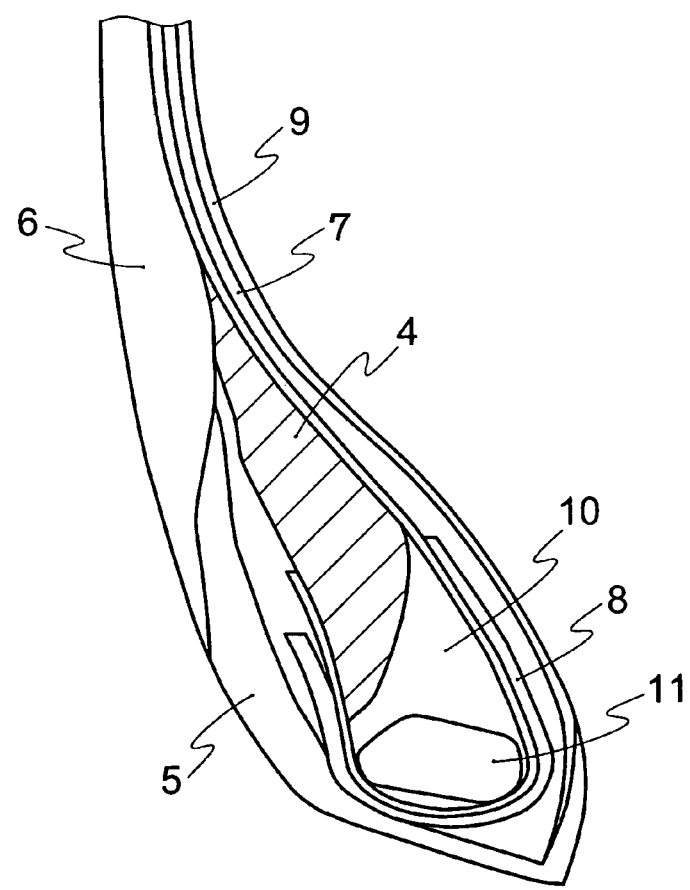
FIG. 2 is a partial sectional view of the bead portion of a radial tire having a side wall packing. Numeral 4, 5, 6, 7, 8, 9, 10, and 11 respectively denote a sidewall packing, a chafer, a sidewall, a carcass, a reinforcing filler, an inner liner, a bead apex, and a bead core.

Further, the side wall packing 4 means a layer provided on the upper portion of a bead apex 10 as shown in FIG. 2.

The rubber composition used for preparing the breaker cushion and the side wall packing, which the radial tire of the present invention has, comprises a rubber component, specific carbon black and silica.

As the rubber component, there can be used diene rubbers such as a natural rubber, a styrene-butadiene rubber and a butadiene rubber, or butyl rubbers such as a butyl rubber and a chlorinated butyl rubber, which are generally used. Among these, the diene rubber is preferably used and a natural rubber is more preferably used, because high strength and low heat buildup which are required as a tire can be imparted.

An iodine adsorption amount of carbon black is at least 25 mg/g. When the iodine adsorption amount is less than 25 mg/g, the aimed fracture feature is impossible to be exhibited and tan δ of the rubber composition is enhanced. Further, the iodine adsorption amount of carbon black is at most 75 mg/g. When the iodine adsorption amount exceeds 75 mg/g, tan δ of the rubber composition becomes large and aimed low fuel cost is not obtained. When the breaker cushion is prepared from the rubber composition, the lower limit of the iodine adsorption amount of carbon black is preferably 25 mg/g and the upper limit thereof is preferably 60 mg/g. Further, when the side wall packing is prepared from the rubber composition, the lower limit of the iodine adsorption amount of carbon black is preferably 40 mg/g and the upper limit thereof is preferably 74 mg/g.

Dibutyl phthalate oil absorption amount (DBP oil absorption amount) of carbon black is at least 110 ml/100 g. When the DBP oil absorption amount is less than 110 ml/100 g, tan δ of the rubber composition becomes large and aimed low fuel cost is not obtained. Further, the DBP oil absorption amount of carbon black is at most 150 ml/100 g. When the DBP oil absorption amount exceeds 150 ml/100 g, the aimed fracture feature is not obtained. When the breaker cushion is prepared from the rubber composition, the lower limit of the DBP oil absorption amount of carbon black is preferably 110 ml/100 g and the upper limit is preferably 135 ml/100 g. Further, when the side wall packing is prepared, the lower limit of the DBP oil absorption amount of carbon black is preferably 120 ml/100 g and the upper limit is preferably 150 ml/100 g.

The amount of carbon black is at least 20 parts by weight based on 100 parts by weight of the rubber component. When the amount is less than 20 parts by weight, reinforcement by carbon black is insufficient and the aimed fracture feature is not obtained. The amount of carbon black is at most 55 parts by weight based on 100 parts by weight of the rubber component. When the amount exceeds 55 parts by weight, tan δ of the rubber composition becomes large and aimed low fuel cost is not obtained. When the breaker cushion is prepared from the rubber composition, the lower limit of the amount of carbon black is preferably 20 parts by weight and the upper limit is preferably 40 parts by weight. Further, when the side wall packing is prepared from the rubber composition, the lower limit of the amount of carbon black is preferably 30 parts by weight and the upper limit is preferably 40 parts by weight.

BET specific surface area of silica is at least 115 m$^2$/g. When the BET specific surface area is less than 115 m$^2$/g, reinforcement by silica is insufficient and the aimed fracture feature is not obtained. Further, the BET specific surface area of silica is at most 200 m$^2$/g. When the BET specific surface area exceeds 200 m$^2$/g, tan δ of the rubber composition is heightened and the aimed low fuel cost is not obtained. When the breaker cushion is prepared from the rubber composition, the lower limit of the BET specific surface area of silica is preferably 140 m$^2$/g and the upper limit is preferably 200 m$^2$/g. Further, when the side wall packing is prepared from the rubber composition, the lower limit of the BET specific surface area of silica is preferably 115 m$^2$/g and the upper limit is preferably 180 m$^2$/g.

The amount of silica is at least 5 parts by weight based on 100 parts by weight of the rubber component. When the amount is less than 5 parts by weight, reinforcement by silica is insufficient and the aimed fracture feature is not obtained. Further, the amount of silica is at most 30 parts by weight based on 100 parts by weight of the rubber component. Further, when the amount exceeds 30 parts by weight, tan δ of the rubber is heightened and the aimed low fuel cost is not obtained. When the breaker cushion is prepared from the rubber composition, the lower limit of the amount of silica is preferably 5 parts by weight and the upper limit is preferably 25 parts by weight. Further, when the side wall packing is prepared from the rubber composition, the lower limit of the amount of carbon black is preferably 10 parts by weight and the upper limit is preferably 30 parts by weight.

Thus, it is necessary in the present invention that carbon black has a specific area of DBP oil absorption amount of 110 to 150 ml/100 g, linkage between carbon black particles is developed to a certain degree, and further, silica has BET specific surface area of 115 to 200 $m^2/g$ and its particles are fine to a certain degree. Further, it is considered that silica having particles finer than carbon black enters into the gaps of carbon black aggregates formed by developing the linkage of carbon black particles in a combination use of carbon black and silica; therefore carbon black is reinforced and as a result, the fracture feature of the radial tire is maintained.

In the rubber composition, zinc oxide, stearic acid, an antioxidant, sulfur and a vulcanization accelerator which are usually used in the tire industry can be compounded, in addition to the fore-mentioned rubber components, carbon black and silica.

Although sulfur generally used at vulcanization in the rubber industry can be used as sulfur, insoluble sulfur is preferably used. Herein, the insoluble sulfur means sulfur which is obtained by heating natural sulfur S8, rapid cooling it and polymerizing it to be Sx (x=one hundred thousands to three hundred thousands). Blooming which occurs usually at using sulfur as a rubber vulcanizing agent can be prevented by using the insoluble sulfur.

The amount of sulfur (pure sulfur amount excluding oil amount) is preferably 1.5 to 2.9 parts by weight based on 100 parts by weight of the rubber component. When the amount of sulfur is less than 1.5 parts by weight, tan δ of the rubber composition becomes large and the aimed low fuel cost tends to be not obtained. Further, when the amount of sulfur exceeds 2.9 parts by weight, the thermal aging property of the rubber composition is deteriorated and the aimed fracture feature tends to be not obtained.

When the breaker cushion is prepared from the rubber composition, the complex elastic modulus E*, which is measured at a measurement temperature of 70° C., an initial strain of 10%, a dynamic strain of ±2% and a frequency of 10 Hz, is preferably at least 3 MPa and more preferably at least 3.5 MPa. When the complex elastic modulus E* is less than 3 MPa, rigidity is insufficient; therefore the deformation of the breaker cushion becomes large and as a result, the low fuel cost tends to be not obtained. Further, the complex elastic modulus E* of the rubber composition is preferably at most 5.5 MPa and more preferably at most 4.5 MPa. Further, when the complex elastic modulus E* exceeds 5.5 MPa, the breaker cushion is hardened and the aimed fracture feature tends to be not obtained.

Further, when the side wall packing is prepared from the rubber composition, the complex elastic modulus E*, which is measured at a measurement temperature of 70° C., an initial strain of 10%, a dynamic strain of ±2% and a frequency of 10 Hz, is preferably at least 4 MPa and more preferably at least 4.5 MPa. When the complex elastic modulus E* is less than 4 MPa, rigidity is insufficient; therefore the deformation of the side wall packing becomes large and as a result, the low fuel cost tends to be not obtained. Further, the complex elastic modulus E* of the rubber composition is preferably at most 6.0 MPa and more preferably at most 5.5 MPa. Further, when the complex elastic modulus E* exceeds 6.0 MPa, the side wall packing is hardened and the aimed fracture feature tends to be not obtained.

When the breaker cushion is prepared from the rubber composition, loss tangent tan δ of the rubber composition, which is measured at a measurement temperature of 70° C., an initial strain of 10%, a dynamic strain of ±2% and a frequency of 10 Hz, is preferably less than 0.05 and more preferably 0.045. When the loss tangent tan δ exceeds 0.05 MPa, the aimed low fuel cost tends to be not obtained.

Further, when the side wall packing is prepared from the rubber composition, the loss tangent tan δ of the rubber composition, which is measured at a measurement temperature of 70° C., an initial strain of 10%, a dynamic strain of ±2% and a frequency of 10 Hz, is preferably at most 0.06 and more preferably at most 0.055. When the loss tangent tan δ exceeds 0.06 MPa, the aimed low fuel cost tends to be not obtained.

The radial tire of the present invention can be prepared by molding the rubber composition to a breaker cushion shape or a side wall packing shape at an uncured stage, and by vulcanizing the uncured tire which is obtained by laminating them with other tire members, at vulcanization temperature of 140 to 160° C. and for a vulcanization time of 30 to 50 min.

The radial tire of the present invention is preferably loaded on a heavy load vehicle. Examples of the heavy load vehicle include a light truck, a heavy truck, a bus, an air plane and the like. Among these, the heavy load vehicle is preferably a heavy truck which runs mainly at high speed in viewpoint that it exhibits easily the effect of low fuel cost.

EXAMPLES

The present invention is specifically explained based on Examples, but the present invention is not limited only thereto.

Various chemicals used in Examples are described below.

NR: RSS#3.

Carbon N134: SHOBLACK N134 (an iodine adsorption amount of 142 mg/g and a DBP oil absorption amount of 127 ml/100 g), manufactured by SHOWA CABOT K.K.

Carbon N220: SHOBLACK N220 (an iodine adsorption amount of 121 mg/g and a DBP oil absorption amount of 114 ml/100 g), manufactured by SHOWA CABOT K.K.

Carbon N351: SHOBLACK N351 (an iodine adsorption amount of 70 mg/g and a DBP oil absorption amount of 120 ml/100 g), manufactured by SHOWA CABOT K.K.

Carbon N550: SHOBLACK N550 (an iodine adsorption amount of 43 mg/g and a DBP oil absorption amount of 121 ml/100 g), manufactured by SHOWA CABOT K.K.

Carbon A: Trial product carbon black (an iodine adsorption amount of 75 mg/g and a DBP oil absorption amount of 120 ml/100 g).

Carbon B: Trial product carbon black (an iodine adsorption amount of 39 mg/g and a DBP oil absorption amount of 120 ml/100 g).

Carbon C: Trial product carbon black (an iodine adsorption amount of 70 mg/g and a DBP oil absorption amount of 109 ml/100 g).

Carbon D: Trial product carbon black (an iodine adsorption amount of 60 mg/g and a DBP oil absorption amount of 151 ml/100 g).

Silica VN3: ULTRASIL VN3 manufactured by Degussa (BET specific surface area: 175 $m^2/g$).

Silica 115Gr: Z115Gr manufactured by Rhodia Corporation (BET specific surface area: 112 $m^2/g$).

Silica A: Trial product silica (BET specific surface area: 119 $m^2/g$).

Silica B: Trial product silica (BET specific surface area: 205 $m^2/g$).

60% Insoluble sulfur: SEIMI SULFUR (a pure sulfur content of 60% and an oil content of 40%) manufactured by Nippon Kanryu Industry Co., Ltd.

Zinc oxide: ZINC OXIDE No. 1 manufactured by MITSUI MINING & SMELTING CO., LTD.

Vulcanization accelerator NS: NOCCELER NS manufactured by OUCHI SHINKO CHEMICAL INDUSTRIAL CO., LTD.

Stearic acid: STEARIC ACID manufactured by NOF CORPORATION.

Antioxidant: RD manufactured by Seiko Chemical Co,. Ltd.

Silane coupling agent: Si266 manufactured by Degussa Corporation.
Vulcanization accelerator NS: NOCCELER NS manufactured by OUCHI SHINKO CHEMICAL INDUSTRIAL CO., LTD.

Examples 1 to 20 and Comparative Examples 1 to 24

Preparation of Tire for Test

The compounding amounts described in Tables 1 to 4 of carbon black and silica, a silane coupling agent of 8% of the compounding amount of silica, 3 parts by weight of zinc oxide, 1.5 parts by weight of stearic acid, and 1.5 parts by weight of an antioxidant were added to 100 parts by weight of a natural rubber, and they were kneaded for about 2 minutes until 150° C. Thereto were added the compounding amount described in Tables 1 to 4 of 60% insoluble sulfur and a vulcanization accelerator NS (the insoluble sulfur indicates pure sulfur content), and they were kneaded for about 2 minutes until 100° C. and extruded to prepare uncured rubber sheets respectively.

By the way, since kneading was difficult in Comparative Examples 2 and 15, they required kneading by 2 times more than the total kneading number of times of Comparative Examples other than Comparative Examples 2, 4, 15 and 17 and Examples.

Further, since kneading was easy in Comparative Examples 4 and 17, they required adequately kneading by one time less than the total kneading number of times of Comparative Examples other than Comparative Examples 2, 4, 15 and 17 and Examples.

The uncured rubber sheets of Examples 1 to 9 and Comparative Examples 1 to 13 were molded to breaker cushions, they were laminated with other tire members to prepare uncured tires, and the tires for test of Examples 1 to 9 and Comparative Examples 1 to 13 were prepared by curing them at 150° C. for 45 minutes (tire size: 11R22.5, 14PR, radial tire with all season pattern).

Further, the uncured rubber sheets of Examples 10 to 20 and Comparative Examples 14 to 24 were molded to side wall packings, they were laminated with other tire members to prepare uncured tires, and the tires for test of Examples 10 to 20 and Comparative Examples 14 to 24 were prepared by curing them at 150° C. for 45 minutes (tire sizes: 11R22.5, 14PR, radial tire with all season pattern).

Tests below were carried out using the obtained tires for test.

(Measurement of Complex Elastic Modulus E* and Loss Tangent Tan δ)

Test pieces having a width of 4 mm, a thickness of 1.8 to 2.2 mm and a length of 30 mm were respectively cut from the breaker cushions of the tires for test of Examples 1 to 9 and Comparative Examples 1 to 13 and the side wall packings of the tires for test of Examples 10 to 20 and Comparative Examples 14 to 24. Further, the complex elastic modulus E* and the loss tangent tan δ were measured at conditions of a measurement temperature of 70° C., an initial strain of 10%, a dynamic strain of ±2% and a frequency of 10 Hz with a viscoelastic spectrometer manufactured by IWAMOTO SEISAKUSYO KABUSHIKIGKAISYA, using the test pieces.

(Fracture Feature After Thermal Aging)

Rubber sheets having a thickness of 1.8 to 2.2 mm were respectively cut from the breaker cushions of the tires for test of Examples 1 to 9 and Comparative Examples 1 to 13 and the side wall packings of the tires for test of Examples 10 to 20 and Comparative Examples 14 to 24, and they were thermally aged at 100° C. for 72 hours with a gear oven thermal aging tester (manufactured by Toyo Seiki Seisakusho, Ltd.). Dumbbell No. 3 test pieces were cut from the rubber sheets after thermal aging. Tensile test was carried out based on JIS K6251 to respectively measure tensile strength at break TB (MPa) and elongation at break EB (%). And values calculated by the formula below from the tensile strength at break TB (MPa) and elongation at break EB (%) obtained were evaluated.

(Fracture feature after thermal aging)=(tensile strength at break $TB$)×(elongation at break)×0.5

<Rolling Resistance Index>

The drum running of respective tires was carried out at conditions of 80 km/hr and a load of 24.5 kN and load resistance was measured. And the measurement value of the load resistance of Comparative Example 1 was referred to as 100 and the measurement values of the load resistance in Tables 1 and 2 were respectively represented by index. Further, the measurement value of the load resistance of Comparative Example 14 was referred to as 100 and the measurement values of the load resistance in Tables 3 and 4 were respectively represented by index (rolling resistance index). The less the index is, the lower the rolling resistance is, and it is superior.

The test result is shown in Tables 1 to 4.

According to the present invention, there can be provided a radial tire reducing rolling resistance by having a breaker cushion or a side wall packing comprising a rubber composition in which the loss tangent tan δ is reduced and the complex elastic modulus E* and the fracture feature (in particular, fracture feature after thermal aging) are improved in good balance by containing the respective specific amounts of specific carbon black and silica.

TABLE 1

| | Ex. | | | | | | Com. Ex. | | | | |
|---|---|---|---|---|---|---|---|---|---|---|---|
| | 1 | 2 | 3 | 4 | 5 | 6 | 1 | 2 | 3 | 4 | 5 |
| Composition (parts by weight) | | | | | | | | | | | |
| NR | 100 | 100 | 100 | 100 | 100 | 100 | 100 | 100 | 100 | 100 | 100 |
| Carbon N134 | — | — | — | — | — | — | — | 20 | — | — | — |
| Carbon N220 | — | — | — | — | — | — | 30 | — | — | — | 25 |
| Carbon N351 | 40 | 20 | — | — | 20 | — | — | — | 30 | — | — |
| Carbon N550 | — | — | 40 | 20 | — | 30 | — | — | — | 30 | — |
| Carbon A | — | — | — | — | — | — | — | — | — | — | — |
| Carbon B | — | — | — | — | — | — | — | — | — | — | — |

TABLE 1-continued

|  | Ex. | | | | | | Com. Ex. | | | | |
| --- | --- | --- | --- | --- | --- | --- | --- | --- | --- | --- | --- |
|  | 1 | 2 | 3 | 4 | 5 | 6 | 1 | 2 | 3 | 4 | 5 |
| Carbon C | — | — | — | — | — | — | — | — | — | — | — |
| Carbon D | — | — | — | — | — | — | — | — | — | — | — |
| Silica VN3 | 5 | 30 | 5 | 30 | — | — | — | — | — | — | — |
| Silica 115Gr | — | — | — | — | — | — | — | — | — | — | — |
| Silica A | — | — | — | — | 5 | 15 | — | — | — | — | — |
| Silica B | — | — | — | — | — | — | — | — | — | — | — |
| 60% Insoluble sulfur | 2.8 | 2.8 | 2.8 | 2.8 | 2.8 | 2.8 | 2.8 | 2.8 | 2.8 | 2.8 | 2.8 |
| Vulcanization accelerator NS | 1 | 1 | 1 | 1 | 1 | 1 | 1 | 1 | 1 | 1 | 1 |
| Evaluation results Tire rubber property |  |  |  |  |  |  |  |  |  |  |  |
| E* (MPa) | 4.3 | 4.8 | 4.2 | 4 | 3.1 | 3.8 | 3.3 | 3.1 | 3.5 | 3.2 | 2.8 |
| tan δ | 0.048 | 0.048 | 0.049 | 0.049 | 0.035 | 0.039 | 0.053 | 0.048 | 0.043 | 0.041 | 0.048 |
| Fracture feature after thermal aging (TB × EB × 0.5) | 2600 | 2500 | 2500 | 2700 | 3500 | 3000 | 2800 | 3100 | 2100 | 2000 | 3200 |
| Rolling resistance index | 99 | 99 | 99 | 99 | 95 | 96 | 100 | 99 | 98 | 97 | 100 |
| Increase or decrease of the number of kneading |  |  |  |  |  |  |  | +2 times |  | −1 time |  |

TABLE 2

|  | Ex. | | | Com. Ex. | | | | | | | |
| --- | --- | --- | --- | --- | --- | --- | --- | --- | --- | --- | --- |
|  | 7 | 8 | 9 | 6 | 7 | 8 | 9 | 10 | 11 | 12 | 13 |
| Composition (parts by weight) |  |  |  |  |  |  |  |  |  |  |  |
| NR | 100 | 100 | 100 | 100 | 100 | 100 | 100 | 100 | 100 | 100 | 100 |
| Carbon N134 | — | — | — | — | — | — | — | — | — | — | — |
| Carbon N220 | — | — | — | 30 | — | — | — | — | — | — | — |
| Carbon N351 | — | — | — | — | — | — | 20 | — | 19 | 30 | — |
| Carbon N550 | — | — | 41 | — | — | — | — | 20 | — | — | 20 |
| Carbon A | 20 | — | — | — | — | — | — | — | — | — | — |
| Carbon B | — | 20 | — | — | — | — | — | — | — | — | — |
| Carbon C | — | — | — | — | 20 | — | — | — | — | — | — |
| Carbon D | — | — | — | — | — | 20 | — | — | — | — | — |
| Silica VN3 | 15 | 30 | 5 | — | 5 | 30 | — | — | 20 | 4 | 31 |
| Silica 115Gr | — | — | — | — | — | — | 5 | — | — | — | — |
| Silica A | — | — | — | — | — | — | — | — | — | — | — |
| Silica B | — | — | — | — | — | — | — | 5 | — | — | — |
| 60% Insoluble sulfur | 2.8 | 2.8 | 2.8 | 3 | 2.8 | 2.8 | 2.8 | 2.8 | 2.8 | 2.8 | 2.8 |
| Vulcanization accelerator NS | 1 | 1 | 1 | 1.5 | 1 | 1 | 1 | 1 | 1 | 1 | 1 |
| Evaluation results Tire rubber property |  |  |  |  |  |  |  |  |  |  |  |
| E* (MPa) | 3.5 | 4.5 | 4.5 | 3.8 | 3 | 5 | 3 | 3 | 3.2 | 3.2 | 4.1 |
| tan δ | 0.051 | 0.048 | 0.05 | 0.047 | 0.05 | 0.041 | 0.038 | 0.05 | 0.05 | 0.042 | 0.05 |
| Fracture feature after thermal aging (TB × EB × 0.5) | 3000 | 2400 | 2500 | 2400 | 3300 | 2200 | 2400 | 3100 | 2400 | 2400 | 2600 |
| Rolling resistance index | 101 | 99 | 100 | 98 | 100 | 97 | 96 | 100 | 98 | 97 | 100 |
| Increase or decrease of the number of kneading |  |  |  |  |  |  |  |  |  |  |  |

TABLE 3

| | Ex. | | | | | | Com. Ex. | | | | |
|---|---|---|---|---|---|---|---|---|---|---|---|
| | 10 | 11 | 12 | 13 | 14 | 15 | 14 | 15 | 16 | 17 | 18 |
| Composition (parts by weight) | | | | | | | | | | | |
| NR | 100 | 100 | 100 | 100 | 100 | 100 | 100 | 100 | 100 | 100 | 100 |
| Carbon N134 | — | — | — | — | — | — | — | 30 | — | — | — |
| Carbon N220 | — | — | — | — | — | — | 35 | — | — | — | 30 |
| Carbon N351 | 30 | 50 | — | — | 30 | — | — | — | 40 | — | — |
| Carbon N550 | — | — | 30 | 50 | — | 30 | — | — | — | 45 | — |
| Carbon A | — | — | — | — | — | — | — | — | — | — | — |
| Carbon B | — | — | — | — | — | — | — | — | — | — | — |
| Carbon C | — | — | — | — | — | — | — | — | — | — | — |
| Carbon D | — | — | — | — | — | — | — | — | — | — | — |
| Silica VN3 | 15 | 10 | 10 | 10 | — | — | — | — | — | — | — |
| Silica 115Gr | — | — | — | — | — | — | — | — | — | — | — |
| Silica A | — | — | — | — | 10 | 15 | — | — | — | — | — |
| Silica B | — | — | — | — | — | — | — | — | — | — | — |
| 60% Insoluble sulfur | 2.5 | 2.5 | 2.5 | 2.5 | 2.5 | 2.5 | 2.5 | 2.5 | 2.5 | 2.5 | 2.5 |
| Vulcanization accelerator NS | 1 | 1 | 1 | 1 | 1 | 1 | 1 | 1 | 1 | 1 | 1 |
| Evaluation results Tire rubber property | | | | | | | | | | | |
| E* (MPa) | 4.5 | 5 | 4 | 4.8 | 4 | 4 | 4.2 | 4 | 4 | 4.4 | 3.8 |
| tan δ | 0.054 | 0.059 | 0.051 | 0.057 | 0.052 | 0.049 | 0.063 | 0.059 | 0.058 | 0.055 | 0.059 |
| Fracture feature after thermal aging (TB × EB × 0.5) | 2800 | 2600 | 3000 | 2500 | 2600 | 2500 | 3000 | 3300 | 2400 | 2300 | 3300 |
| Rolling resistance index | 96 | 98 | 95 | 98 | 96 | 94 | 100 | 99 | 98 | 97 | 100 |
| Increase or decrease of the number of kneading | | | | | | | | +2 times | | −1 time | |

TABLE 4

| | Ex. | | | | | Com. Ex. | | | | | |
|---|---|---|---|---|---|---|---|---|---|---|---|
| | 16 | 17 | 18 | 19 | 20 | 19 | 20 | 21 | 22 | 23 | 24 |
| Composition (parts by weight) | | | | | | | | | | | |
| NR | 100 | 100 | 100 | 100 | 100 | 100 | 100 | 100 | 100 | 100 | 100 |
| Carbon N134 | — | — | — | — | — | — | — | — | — | — | — |
| Carbon N220 | — | — | — | — | — | 35 | — | — | — | — | — |
| Carbon N351 | — | — | 29 | — | 30 | — | — | — | 30 | — | — |
| Carbon N550 | — | — | — | 41 | — | — | — | — | — | 30 | 20 |
| Carbon A | 30 | — | — | — | — | — | — | — | — | — | — |
| Carbon B | — | 30 | — | — | — | — | — | — | — | — | — |
| Carbon C | — | — | — | — | — | — | 30 | — | — | — | — |
| Carbon D | — | — | — | — | — | — | — | 30 | — | — | — |
| Silica VN3 | 10 | 30 | 20 | 10 | 9 | — | 10 | 10 | — | — | 31 |
| Silica 115Gr | — | — | — | — | — | — | — | — | 9 | — | — |
| Silica A | — | — | — | — | — | — | — | — | — | — | — |
| Silica B | — | — | — | — | — | — | — | — | — | 10 | — |
| 60% Insoluble sulfur | 2.5 | 2.5 | 2.5 | 2.5 | 2.5 | 3 | 2.5 | 2.5 | 2.5 | 2.5 | 2.5 |
| Vulcanization accelerator NS | 1 | 1 | 1 | 1 | 1 | 1.5 | 1 | 1 | 1 | 1 | 1 |
| Evaluation results Tire rubber property | | | | | | | | | | | |
| E* (MPa) | 4.3 | 5.1 | 4.2 | 4.5 | 4.2 | 4.5 | 4.1 | 4.7 | 4 | 4.5 | 5.1 |
| tan δ | 0.061 | 0.057 | 0.06 | 0.06 | 0.05 | 0.058 | 0.062 | 0.051 | 0.055 | 0.06 | 0.06 |
| Fracture feature after thermal aging (TB × EB × 0.5) | 3400 | 2400 | 2400 | 2500 | 2400 | 2100 | 3500 | 2400 | 2400 | 3100 | 2600 |
| Rolling resistance index | 100 | 98 | 96 | 100 | 96 | 98 | 101 | 95 | 96 | 100 | 100 |
| Increase or decrease of the number of kneading | | | | | | | | | | | |

What is claimed is:

1. A radial tire having a breaker cushion or a side wall packing which is a layer provided on the upper portion of a bead apex comprising a rubber composition containing 20 to 40 parts by weight of carbon black having an iodine adsorption amount of 39 to 75 mg/g and a dibutyl phthalate oil absorption amount of 110 to 121 ml/100 g; and 5 to 25 parts by weight of silica having a BET specific surface area of 119 to 175 m$^2$/g based on 100 parts by weight of a rubber component, wherein the rubber component consists only of a natural rubber and wherein the rubber composition has a complex elastic modulus E* which is measured at a measurement temperature of 70° C., an initial strain of 10%, a dynamic strain of ±2% and a frequency of 10 Hz is at least 4 MPa, and a loss tangent tan δ is less than 0.05 in the fore-mentioned rubber composition.

2. The radial tire of claim 1, which has a breaker cushion comprising the rubber composition in which the amount of carbon black is 20 to 40 parts by weight and a complex elastic modulus E* which is measured at a measurement temperature of 70° C., an initial strain of 10%, a dynamic strain of ±2% and a frequency of 10 Hz is 4 to 5.5 MPa; and a loss tangent tan δ is less than 0.05 in the fore-mentioned rubber composition.

3. The radial tire of claim 1, which has a side wall packing which is a layer provided on the upper portion of a bead apex comprising the rubber composition in which the iodine adsorption amount of carbon black is 40 to 74 mg/g and the amount thereof is 30 to 40 parts by weight; the amount of silica is 10 to 25 parts by weight; a complex elastic modulus E* which is measured at a measurement temperature of 70° C., an initial strain of 10%, a dynamic strain of ±2% and a frequency of 10 Hz is at least 4 MPa; and a loss tangent tan δ is less than 0.05 in the fore-mentioned rubber composition.

4. A radial tire of claim 1, which is loaded on a heavy load vehicle.

* * * * *